| United States Patent [19] | [11] Patent Number: 5,077,363 |
| Eisenbarth et al. | [45] Date of Patent: Dec. 31, 1991 |

[54] HEAT-CURABLE BISMALEIDMIDE/ALKENYL PHENOL/N-VINYL PYRROLIDONE RESIN

[75] Inventors: Philipp Eisenbarth, Bad Durkheim; Roland Peter, Mutterstadt; Thomas Folda, Neuleiningen, all of Fed. Rep. of Germany

[73] Assignee: BASF Aktiengesellschaft, Ludwigshafen, Fed. Rep. of Germany

[21] Appl. No.: 505,818

[22] Filed: Apr. 6, 1990

[30] Foreign Application Priority Data

Apr. 17, 1989 [DE] Fed. Rep. of Germany ....... 3912532

[51] Int. Cl.$^5$ .................... C08F 26/10; C08F 22/40

[52] U.S. Cl. .................... 526/262; 526/263; 526/264; 528/170; 528/322

[58] Field of Search ............... 526/262, 263, 264; 528/322, 170

[56] References Cited

U.S. PATENT DOCUMENTS

| 4,035,345 | 7/1977 | Ducloux et al. | 526/90 |
| 4,100,140 | 7/1978 | Zahir et al. | 260/78 |
| 4,752,641 | 6/1988 | Koyama et al. | 526/261 |

Primary Examiner—Harold D. Anderson
Attorney, Agent, or Firm—William G. Conger

[57] ABSTRACT

Heat-curable resins which are suitable for fabricating carbon fiber prepregs and fiber composites by winding and resin transfer molding contain a bismaleimide, an alkenylphenol and N-vinylpyrrolidone.

3 Claims, No Drawings

HEAT-CURABLE BISMALEIDMIDE/ALKENYL PHENOL/N-VINYL PYRROLIDONE RESIN

The present invention relates to heat-curable resins of low viscosity and to carbon fiber prepregs of improved tack produced therefrom.

Bismaleimide resins which according to U.S. Pat. No. 4,100,140 contain alkenylphenols or alkenylphenol ethers as comonomers are curable into materials having good mechanical and electrical properties. However, the production of prepregs by impregnating reinforcing fibers presents difficulties, since the resins have a relatively high viscosity at room temperature and, if the temperature is increased, the curing process starts In addition, carbon fiber prepregs on this basis have insufficient tack, so that the individual prepregs do not stay in place when laid on top of one another in the production of an engineering material Moreover, the high melt viscosities and the short pot lives preclude the possibility of processing using the winding or the resin transfer molding (RTM) technique.

According to U.S. Pat. No. 4,752,641, the viscosity of bismaleimide resins which contain alkylphenols as comonomers can be improved by adding allyl esters, for example triallyl isocyanurate. However, it is necessary to use relatively large amounts of triallyl isocyanurate, resulting in a high network density on curing and hence a deterioration in the toughness.

U.S. Pat. No. 4,035,345 describes bismaleimide resins which contain diamines as comonomers and an addition of an allyl or vinyl compound. Suitable vinyl compounds mentioned also include N-vinylpyrrolidone. However, such resins are not suitable for producing prepregs since they have no tack at all. If in the preferred resin system of U.S. Pat. No. 4,035,345 comprising bismaleimide, diamine and allyl phthalate the diamine comonomer is replaced by an alkenylphenol comonomer, the prepreg tack is improved, but the cured materials lack toughness.

It is an object of the present invention to develop bismaleimide resins of reduced viscosity from which it is possible to produce prepregs having improved tack and which can be processed by the winding and RTM techniques. Cured materials produced from these resins or prepregs should be very tough.

We have found that this object is achieved according to the present invention by a heat-curable bismaleimide resin containing
A. 100 parts by weight of bismaleimide,
B. 20-100 parts by weight of alkenylphenol and
C. 1-10 parts by weight of N-vinylpyrrolidone.

We have found, surprisingly, that cured components from such resins show improved toughness compared with resins without N-vinylpyrrolidone.

Component A can be a bismaleimide of the general formula

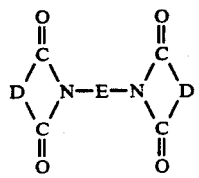

where D is a substituted or unsubstituted hydrocarbon double bond and E is a divalent radical of at least two carbon atoms. Bismaleimides are known for example from DE-A-2 040 094, DE-A-2 719 903 and DE-A-3 247 058. Besides bismaleimides it is basically also possible to use polymaleimides, as well as mixtures of different bismaleimides Preferred bismaleimides are 4,4'-bismaleimidodiphenylmethane, 4,4'-bismaleimidodiphenyl ether, 3,3'-bismaleimidodiphenyl sulfone, 1,3-bismaleimidobenzene, 2,4-bismaleimidotoluene, 1,6-bismaleimidohexane and 2,2,4-trimethyl-1,6-bismaleimidohexane. It is also possible for up to 20% by weight of a monoimide to be present.

Alkenylphenols B are monocyclic or polycyclic aromatic compounds which have not only an OH group but also an alkenyl group on the same benzene ring. Preference is given to bicyclic allylphenols, for example o,o,-diallylbisphenol A; similarly suitable allylphenols are based for example on bisphenol F or corresponding novolaks, bisphenol S or hydroquinone. They are prepared by reacting the corresponding phenols in a conventional manner with for example allyl chloride in the presence of a base to give the corresponding allylphenyl ethers which are then converted at about 200° C. in a Claisen arrangement into the ortho-allylphenols according to the present invention.

The proportion of alkenylphenol B is from 20 to 100 parts, based on 100 parts of bismaleimide; preference is given to 30 to 60 parts. If the proportion is lower, the viscosity increases and the tack of corresponding prepregs is too low, which leads to problems in processing; if the proportion is higher than 100 parts, the glass transition temperature becomes excessively low.

N-Vinylpyrrolidone used as component C is a virtually odorless, colorless and relatively nontoxic liquid. It is used in amounts of from 1 to 10, preferably from 2 to 8, parts by weight, based on 100 parts by weight of bismaleimide A.

It is true that if the amount is higher the tack increases still further and the viscosity of the resin melt decreases, but the glass temperature then decreases very rapidly.

The mixtures may also contain catalysts and inhibitors. Suitable catalysts are tertiary amines or phosphines, imidazoles or organic acids or peroxides. Suitable inhibitors are hydroquinone, benzoquinone and phenothiazine. The amount of initiator and inhibitor used is approximately 0.05-1.0 part by weight, based on 100 parts by weight of A.

It is also possible to add customary fillers and reinforcing agents, for example quartz powder, kaolin, mica, graphite powder or a metal powder, and also glass and carbon fibers, preferably in amounts of up to 200 parts by weight, based on 100 parts by weight of component A.

Preferably the resins according to the present invention do not contain any diamine curing agent.

To prepare the bismaleimide resins according to the present invention, the starting materials are mixed in a conventional manner and heated to 70'-190° C. to form a prepolymer. Depending on the rate of prepolymerization, the product obtained is a relatively low-viscosity melt or a glassy solid which, depending on the intended use, is ground or dissolved in a solvent. The resins can also be prepared in a solvent.

The mixtures according to the present invention can be used as impregnating, casting and laminating resins or as filled or unfilled molding compositions.

A preferred use is the production of prepregs or advanced composite materials by impregnating glass, carbon or aramid fibers with formation of unidirectional or woven prepregs either from the melt at 50°–120° C. or from solution. Suitable solvents are halogenated hydrocarbons, e.g. dichloromethane, ketones, e.g. acetone or methyl ethyl ketone, glycol esters, toluene, dimethylformamide, N-methylpyrrolidone and mixtures thereof.

Preference is given to impregnating the fibers of the melt at from 40° to 120° C., preferably from 60 to 90° C. The reinforcing fibers are oriented in the preferred direction of the later composite material; it is possible to use customary continuous fiber strands (rovings) made of glass, aromatic polyamides or preferably carbon, which may be used as individual rovings, as parallel laid webs or as woven fabrics.

The volume ratio of plastics matrix to reinforcing fibers is preferably within the range from 70:30 to 15:85, in particular from 50:50 to 30:70.

The prepregs produced according to the present invention can be used in a conventional manner to fabricate sheetlike components by cutting, laying up and shaping or for fabricating rotationally symmetric components by winding. They are then cured by heating at from 150° to 300° C., preferably from 160 to 260° C., with or without pressure, to give advanced composites. The curing temperature chosen depends crucially on the length of cure, and vice versa. It is frequently advantageous to employ a step by step curing program in which initially the polymers are crosslinked at a lower temperature in a mold. Demolding can then be followed by an after cure at above 200° C. for several hours, if necessary.

If the winding technique is to be employed, the reinforcing fibers can be impregnated with the resin mixture according to the present invention not only from the melt but also from solution. The melt impregnation is preferred and is carried out at from 80° to 120° C. in a temperature-controllable impregnating bath. The impregnated rovings are aligned and wound onto a rotating mandrel in a predetermined geometry. Curing is again carried out step by step at the stated temperatures. An aftercure at above 200° C. after removal from the mandrel increases the glass transition temperature.

In the RTM process, first a three-dimensional, possibly complex, preshape constructed from continuous fiber mats, woven or knitted fabrics is placed in a mold. The mold is then sealed and liquid resin mixture is injected. Finally the resin is cured in the mold at elevated temperature, and the fiber composite is removed from the mold.

The advanced composite materials obtained have excellent mechanical and thermal properties and can be used in particular as shaped articles in the automotive and aerospace industries.

EXAMPLE 1

In a stirred vessel, 2,100 g of 4,4′-bismaleimidodiphenylmethane, 850 g of o,o′-diallylbisphenol A and 150 g of N-vinylpyrrolidone were mixed at 150° C. until a homogeneous melt had formed.

To determine the mechanical properties of the unreinforced molding substance, one part of the resin was poured between metal shapes and cured at 150° C. for 2 hours, at 180° C. for 7 hours and at 240° C. for 8 hours. The test specimen produced therefrom was found to have the properties indicated in the table.

To produce unidirectional prepregs on the basis of a carbon fiber of type T 800 (from Toray, Japan), the bismaleimide resin was first applied at 70° C. as a film about 60 μm in thickness to a continuously moving prepreg paper and the fiber tape, which had a basis weight of 135 g/m$^2$, was then placed in the resin film at 85° C. under pressure and completely impregnated. The resin content of the prepreg produced in this manner was 35%, corresponding to a nominal prepreg thickness of 0.125 mm, based on a fiber content of 60 % by volume. The prepreg showed good tack.

To fabricate a unidirectionally reinforced advanced composite, a plurality of prepreg layers (as required by the test standard) were placed on top of one another to produce laminates which were cured by the abovementioned curing cycle. The test results are shown in the table.

The KIc and GIc values and also the compression after impact strength are measures of the toughness of a material.

COMPARATIVE EXAMPLE

Example 1 was repeated, except that the N-vinylpyrrolidone was omitted. The results are likewise shown in the table.

TABLE

|  | Example 1 | Comparative Example |
|---|---|---|
| Uncured resin: viscosity (75° C., mPas) | 2200 | >4000 |
| Cured pure resin: |  |  |
| KIc value (MPa · ml/2) | 0.91 | 0.71 |
| GIc value (J/m$^2$) | 150 | 105 |
| [each by ASTM E 399] |  |  |
| Laminate: |  |  |
| GIc value (J/m$^2$) | 375 | 263 |
| [by NASA test standard RP 1092] |  |  |
| Residual compressive strength or compression after impact strength (MPa) [by ASTM D 695] | 150 | 129 |

We claim:

1. A heat-curable bismaleimide resin containing
   (A) 100 parts by weight of bismaleimide,
   (B) 20–100 parts by weight of alkenylphenol and
   (C) 1–10 parts by weight of N-vinylpyrrolidone.

2. A bismaleimide resin as claimed in calim 1, wherein the alkenylphenol is a diallyphenol.

3. The bismaleimide resin of claim 2 wherein said diallylphenol is o,o′-diallylbisphenol A.

* * * * *